(12) United States Patent
Takano et al.

(10) Patent No.: US 7,403,789 B2
(45) Date of Patent: Jul. 22, 2008

(54) SYNCHRONIZATION ESTABLISHMENT BETWEEN A MOBILE STATION AND BASE STATION SYSTEM AND METHOD USED FOR THEM

(75) Inventors: Nahoko Takano, Tokyo (JP); Kojiro Hamabe, Tokyo (JP); Soichi Tsumura, Tokyo (JP); Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 364 days.

(21) Appl. No.: 10/553,236

(22) PCT Filed: Apr. 16, 2004

(86) PCT No.: PCT/JP2004/005447

§ 371 (c)(1),
(2), (4) Date: Oct. 14, 2005

(87) PCT Pub. No.: WO2004/093476

PCT Pub. Date: Oct. 28, 2004

(65) Prior Publication Data

US 2006/0058051 A1    Mar. 16, 2006

(30) Foreign Application Priority Data

Apr. 16, 2003    (JP)    ............................... 2003-110960

(51) Int. Cl.
*H04B 7/00*    (2006.01)
*H04B 15/00*    (2006.01)
*H04B 7/212*    (2006.01)
*H04J 3/06*    (2006.01)

(52) U.S. Cl. ....................... 455/502; 370/324; 370/350; 370/503

(58) Field of Classification Search ................. 455/502, 455/509, 511, 515, 522; 370/324, 345, 350, 370/503; 342/356, 395, 31
See application file for complete search history.

(56) References Cited

U.S. PATENT DOCUMENTS 6,259,683 B1 *    7/2001    Sekine et al. ............... 370/328

(Continued)

FOREIGN PATENT DOCUMENTS

JP        08-48516 A        2/1993

(Continued)

OTHER PUBLICATIONS

3GPP TR (Technical Report) 25. 858, V5. 0. 0, Mar. 2002.

*Primary Examiner*—Nay A. Maung
*Assistant Examiner*—Andrew Wendell
(74) *Attorney, Agent, or Firm*—Sughrue Mion, PLLC

(57) ABSTRACT

There is provided a mobile communication system capable of reducing the power consumption in the packet wait state and promptly transmitting a packet when data transmission is requested. At a predetermined synchronization establishment interval start time (T1), a base station starts transmission of DPCH (DL) which is a downlink individual channel. A mobile station receives the DPCH (DL) and starts synchronization establishment operation. If the synchronization of the DPCH (DL) is not established by the synchronization establishment interval end time (T2), the synchronization establishment operation is continued. If the base station cannot detect transmission of the DPCH (UL) which is an uplink individual channel from the base station by the synchronization establishment interval end time (T2), the base station continues transmission of the DPCH (DL) to the mobile station and suspends user data transmission in the state update information to the mobile station and DPCH (DL) to the mobile station and control signal transmission to an upper node layer until the DPCH (UL) transmission is detected.

30 Claims, 10 Drawing Sheets

U.S. PATENT DOCUMENTS

| | | | |
|---|---|---|---|
| 6,643,524 B1* | 11/2003 | Ishii et al. | 455/560 |
| 6,714,524 B1* | 3/2004 | Kim et al. | 370/335 |
| 6,959,017 B2* | 10/2005 | Nakai et al. | 370/517 |
| 6,967,936 B1* | 11/2005 | Laroia et al. | 370/329 |
| 7,257,103 B2* | 8/2007 | Yeh et al. | 370/337 |
| 2002/0114356 A1* | 8/2002 | Morita et al. | 370/503 |
| 2002/0172200 A1* | 11/2002 | Shin et al. | 370/389 |
| 2003/0031162 A1* | 2/2003 | Chitrapu et al. | 370/350 |
| 2003/0050083 A1* | 3/2003 | Metais et al. | 455/509 |
| 2003/0087655 A1* | 5/2003 | Matsuoka | 455/502 |
| 2003/0118056 A1* | 6/2003 | Ali et al. | 370/503 |
| 2003/0119524 A1* | 6/2003 | Carlsson | 455/456 |
| 2003/0123490 A1* | 7/2003 | Kaku et al. | 370/503 |
| 2004/0109422 A1* | 6/2004 | Naito | 370/328 |
| 2005/0135429 A1* | 6/2005 | Bingham et al. | 370/503 |
| 2006/0072624 A1* | 4/2006 | Akita et al. | 370/503 |

FOREIGN PATENT DOCUMENTS

| | | |
|---|---|---|
| JP | 08-172387 A | 7/1996 |
| JP | 09-321687 A | 12/1997 |
| JP | 10-290194 A | 10/1998 |
| JP | 2002-190757 A | 7/2002 |

* cited by examiner

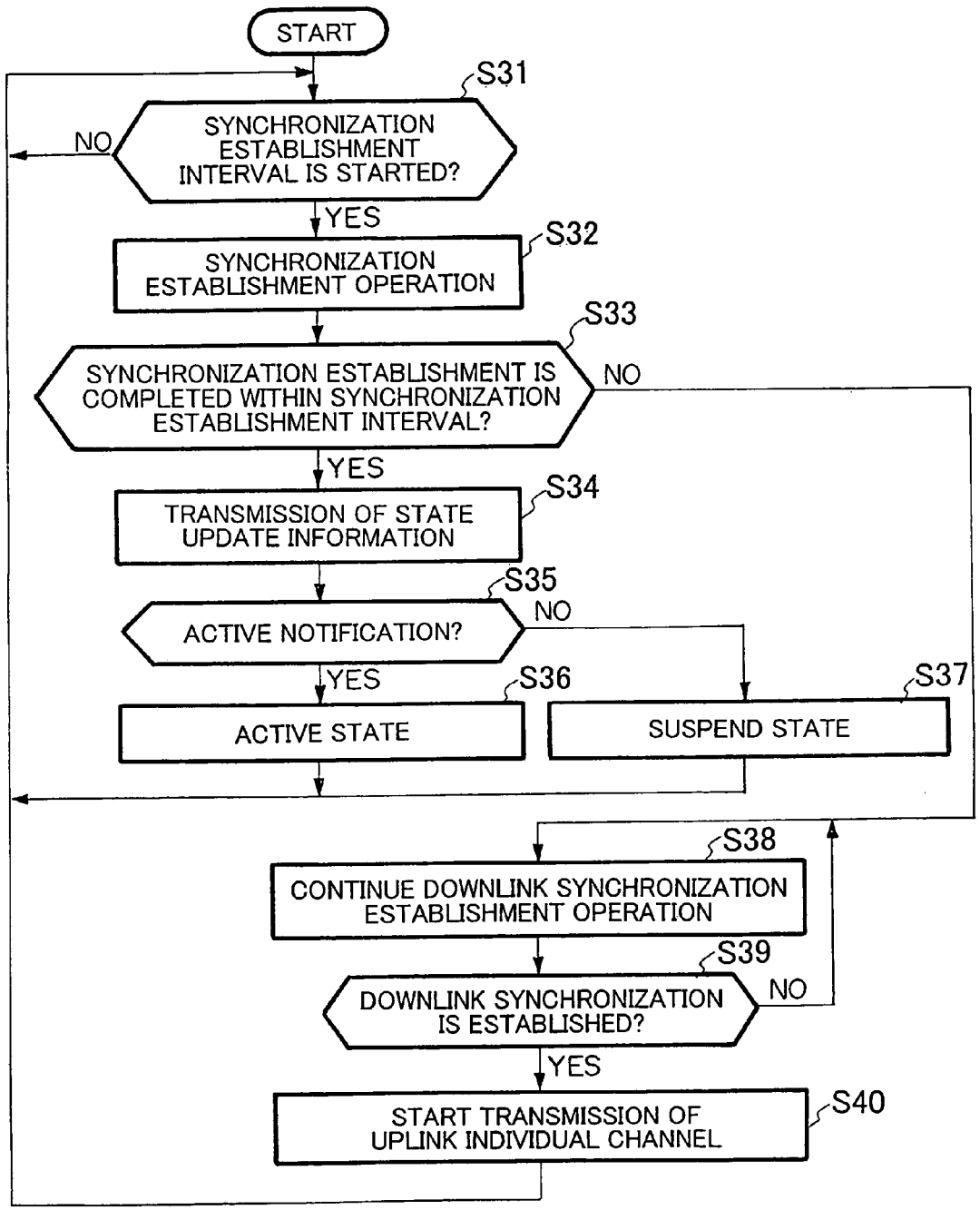

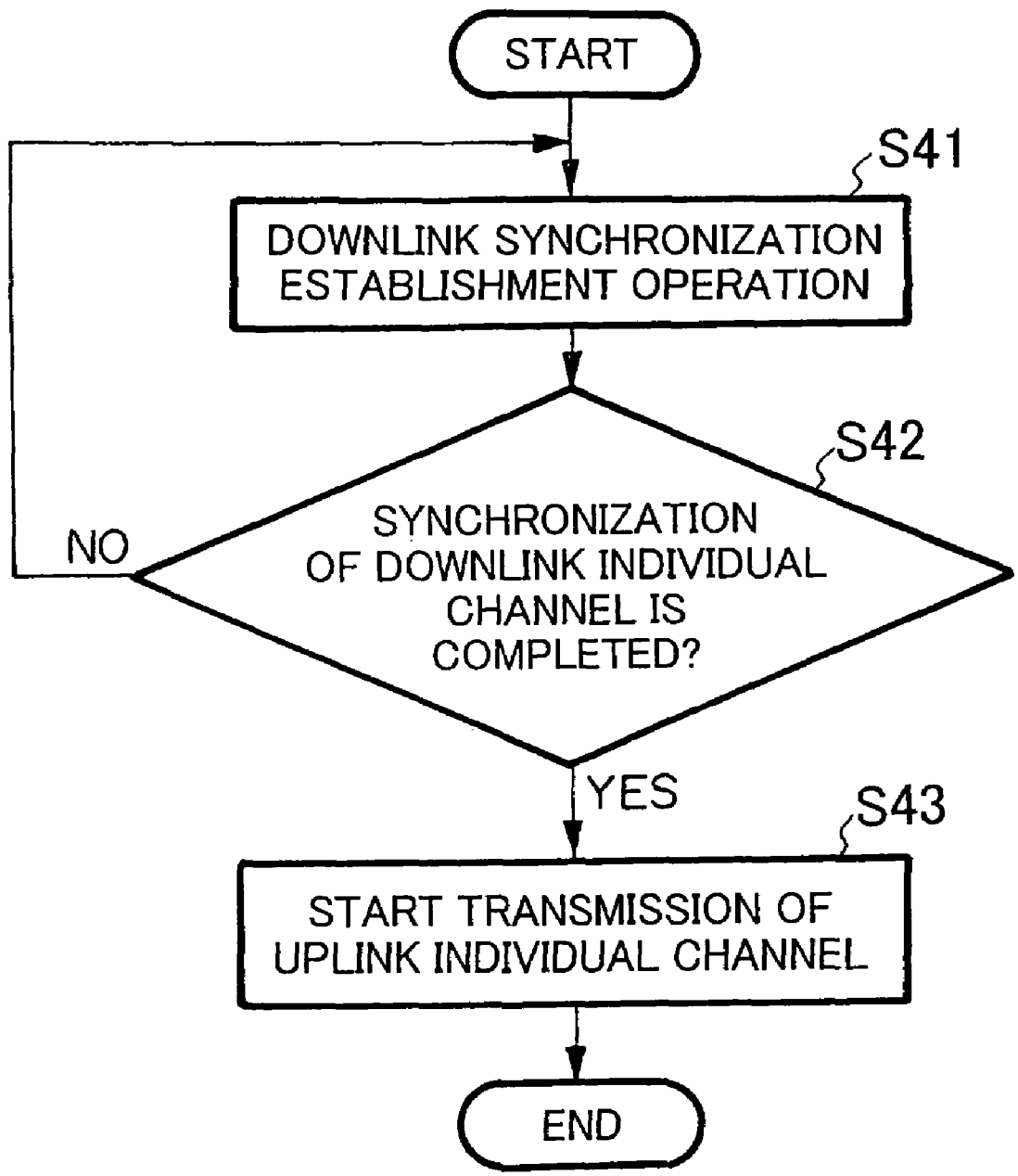

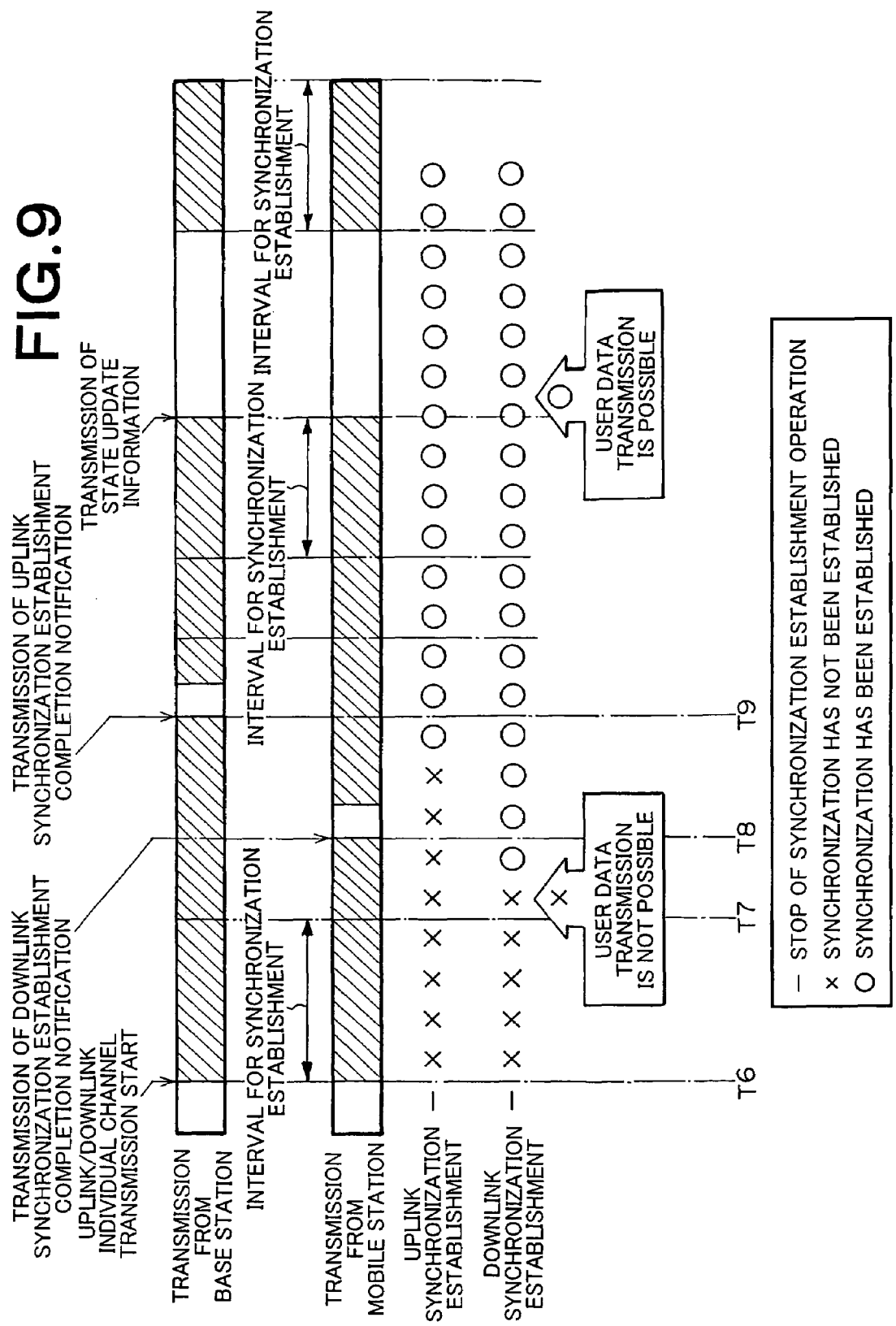

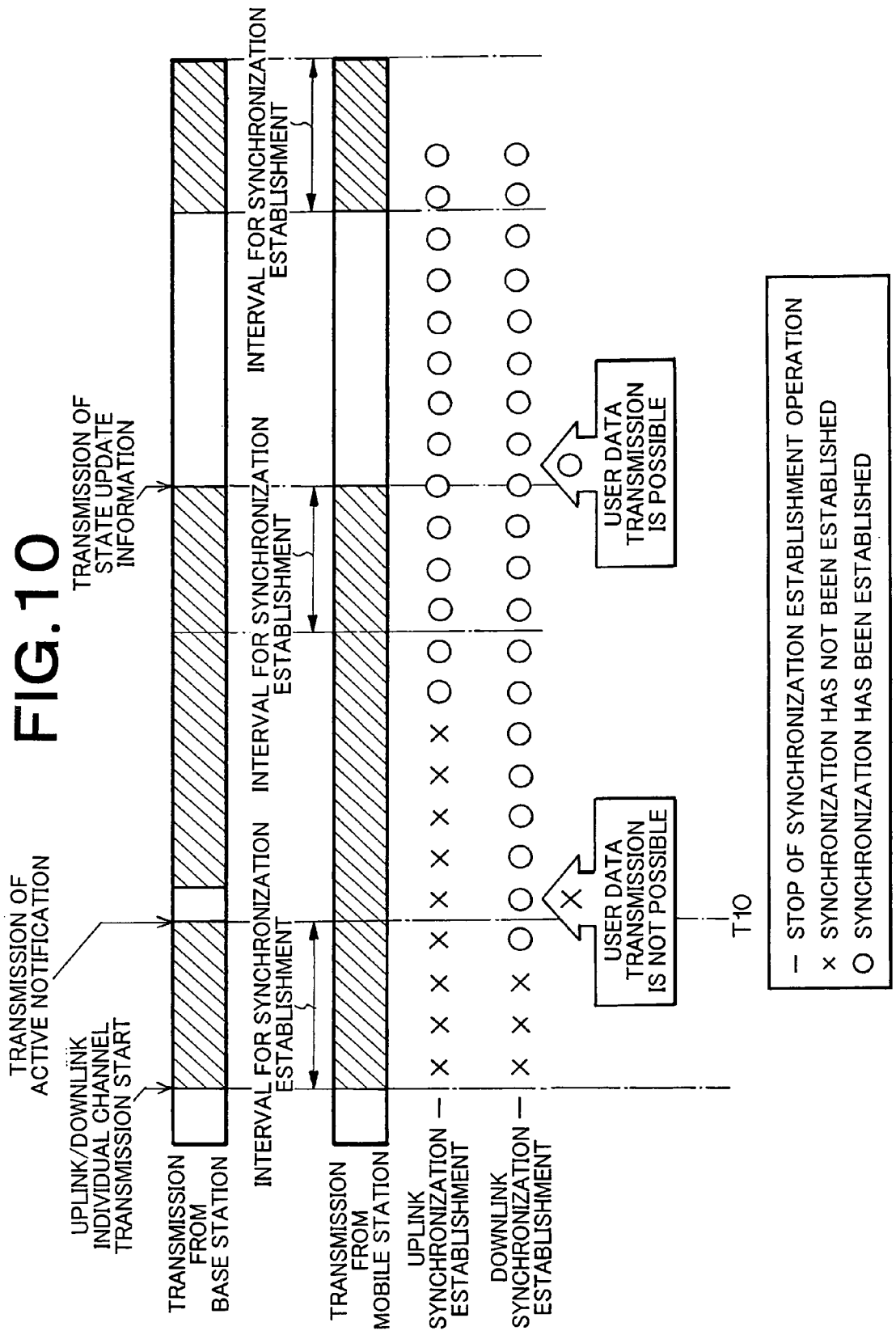

SYNCHRONIZATION ESTABLISHMENT BETWEEN A MOBILE STATION AND BASE STATION SYSTEM AND METHOD USED FOR THEM

CROSS REFERENCE TO RELATED APPLICATIONS

This application is a national phase application of International Application No. PCT/JP04/05447 filed on Apr. 16, 2004, and claims priority of Japan Patent Application No. 2003-110960 filed on Apr. 16, 2003.

1. Technical Field

The present invention relates to a mobile communication system, a base station, a mobile station, and a wireless communication method for use in the system and stations and, more particularly, to a high speed data transmission such as an HSDPA (High Speed Downlink Packet Access) service or the like in a mobile communication system.

2. Background Art

Conventionally, in the HSDPA service, DPCH (Dedicated Physical Channel which is an individual channel)) [DL (Downlink)/UL (Uplink)] has been set between a mobile station and base station. To the base station, a base station controller (an RNC (Radio Network Controller), etc.) is connected.

The mobile station constantly receives specified four HS-SCCH (High Speed Shared Control Channel) channels from the base station to detect information related to a mobile station ID (Identifier) included in the HS-SCCH, and determines whether the information of the mobile station ID corresponds to the own mobile station ID.

When detecting the own mobile station ID on the HS-SCCH, the mobile station uses control information transmitted on the HS-SCCH to receive HS-PDSCH (High Speed Physical Downlink Shared Channel) which is transmitted a predetermined time after the HS-SCCH.

When data to be transmitted on the individual channel (hereinafter, referred to as "individual channel data") among user data, higher layer control information, or the like is generated, the base station and mobile station immediately use the DPCH (UL/DL) to transmit the individual channel data (refer to, for example, non-patent document "3GPP TR (Technical Report) 25. 858, V5. 0. 0, March, 2002").

The abovementioned HSDPA is a system for a high speed packet transmission on the downlink. The system transmits CPICH (Common Pilot Channel), HS-PDSCH, HS-SCCH, and DPCH (DL) on the downlink in the HSDPA service receivable state, and transmits HS-DPCCH (High Speed Dedicated Physical Control Channel) and DPCH (UL) on the uplink.

The CPICH is a pilot signal to be transmitted to all mobile stations within the cell of the base station. The CPICH is transmitted at a predetermined power level from the base station and used for path search, estimation of transmission path, measurement of downlink reception quality, and the like.

The HS-PDSCH is a shared channel that transmits user data as packet data and shared in a time multiplex mode between a plurality of mobile stations.

The HS-SCCH is a shared channel for transmitting control data required to receive a packet transmitted on the HS-PDSCH and shared in a time multiplex mode between a plurality of mobile stations. Each mobile station constantly receives one or more HS-SCCH. When the received HS-SCCH is destined for the own mobile station, the mobile station uses control information of the HS-SCCH to receive a packet on the HS-PDSCH.

The DPCH (DL/UL) includes DPCCH (Dedicated Physical Control Channel which is an individual control channel) and DPDCH (Dedicated Physical Data Channel which is an individual data channel).

On the DPCCH, control information of a physical layer, such as TPC (Transmit Power Control) bit which is transmission power control information of channels to be paired and TFCI (Transport Format Combination Indication which is transmission format information) representing the structure of the DPDCH is transmitted. On the DPDCH, individual channel data which is user data or a higher layer signal is transmitted.

The HS-DPCCH is an individual channel for transmitting CQI (Channel Quality Indication which is downlink quality information) determined by a result of the quality measurement for the CPICH and ACK/NACK (Acknowledgement/Negative Acknowledgements) which is acknowledge information of a packet received.

In the above conventional HSDPA service, however, the timing at which a packet is transmitted from the base station cannot be specified in the mobile station, so that it is necessary for the mobile station to receive the HS-SCCH irrespective of presence/absence of a packet transmission and to set a channel for transmitting/receiving the control information indicating whether the packet is destined for the own station. Therefore, the power of the mobile station is consumed even when the time needed to receive the packet is short.

In particular, a high-speed packet transmission system such as the HSDPA is frequently used in a service, such as web browsing, that intermittently repeats data download, so that the power consumption of the mobile station is increased even when the time needed to receive the packet is short.

Further, when individual channel data to be transmitted is generated, the mobile station immediately use the DPCH to transmit the individual channel data, so that it is necessary for the mobile station to set the DPCH irrespective of presence/absence of a packet transmission, which causes excess terminal power to be consumed.

The base station and mobile station continue transmission and reception of the DPCCH (UL/DL) even at the time when they do not transmit uplink individual channel data, and the mobile station transmits individual channel data at an arbitrary timing, so that it is necessary for the base station and mobile station to set the DPCH irrespective of presence/absence of transmission of individual channel data, which causes excess terminal power to be consumed.

DISCLOSURE OF THE INVENTION

An object of the present invention is to provide a mobile communication system, a base station, and a mobile station capable of solving above problems to promptly transmit a packet when data transmission is requested while reducing the power consumption in the packet wait state, and a wireless communication method for use in the mobile communication system, base station, and mobile station.

According to the present invention, there is provided a first mobile communication system comprising: a base station; and a mobile station which performs data transmission/reception with the base station using a wireless link set between them, wherein the base station comprises: a means for transmitting a downlink individual channel to the mobile station; a means for starting synchronization establishment operation of an uplink individual channel in response to transmission of the uplink individual channel from the mobile station to the base station; and a means for performing transmission/reception of data to be transmitted in the case where the synchronization between the uplink individual channel and downlink individual channel has been established at a third timing of a specified cycle previously set and the data to be transmitted between the base station and mobile station exists, wherein the mobile station comprises: a means for starting synchronization establishment operation of the downlink individual channel at a second timing of a specified cycle previously set; a means for starting transmission of the uplink individual channel to the base station at the time when the synchronization of the downlink has been established; a means for performing transmission/reception of data to be transmitted in the case where the synchronization between the uplink individual channel and downlink individual channel has been established at the third timing of a specified cycle previously set and the data to be transmitted between the base station and mobile station exists; and a means for suspending at least one of the transmission of the uplink individual channel or reception of the downlink individual channel in the case where the synchronization between the uplink individual channel and downlink individual channel has been established at the third timing and the data to be transmitted between the base station and mobile station does not exist, and wherein when the synchronization of the uplink individual channel or the downlink individual channel has not been established at the third timing, the synchronization establishment operation is continued.

In the first mobile communication system according to the present invention, the base station and mobile station may further comprise a means for continuing the synchronization establishment operation in the case where the synchronization of the uplink individual channel or downlink individual channel has not been established at the third timing. The mobile station may further comprise a means for continuing the synchronization establishment operation by continuing the transmission of the uplink individual channel or reception of the downlink individual channel in the case where the synchronization of the uplink individual channel or downlink individual channel has not been established at the third timing. The base station may further comprise a means for continuing the synchronization establishment operation by continuing the transmission of the downlink individual channel or reception of the uplink individual channel in the case where the synchronization of the uplink individual channel or downlink individual channel has not been established at the third timing.

According to the present invention, there is provided a second mobile communication system comprising: a base station; and a mobile station that performs data transmission/reception with the base station using a wireless link set between them, wherein the base station comprises: a means for transmitting a downlink individual channel to the mobile station; a means for starting synchronization establishment operation of an uplink individual channel to be transmitted from the mobile station to the base station at a first timing of a specified cycle previously set; and a means for performing transmission/reception of data to be transmitted in the case where the synchronization between the uplink individual channel and downlink individual channel has been established at a third timing of a specified cycle previously set and the data to be transmitted between the base station and mobile station exists, wherein the mobile station comprises: a means for transmitting the uplink individual channel to the base station; a means for starting synchronization establishment operation of the downlink individual channel at a second timing of a specified cycle previously set; a means for performing transmission/reception of data to be transmitted in the case where the synchronization between the uplink individual channel and downlink individual channel has been established at a third timing of a specified cycle previously set and the data to be transmitted between the base station and the mobile station exists; and a means for suspending at least one of the transmission of the uplink individual channel or reception of the downlink individual channel in the case where the synchronization between the uplink individual channel and downlink individual channel has been established at the third timing and the data to be transmitted between the base station and the mobile station does not exist, and wherein when the synchronization of the uplink individual channel or the downlink individual channel has not been established at the third timing, the synchronization establishment operation is continued.

In the second mobile communication system according to the present invention, the base station and mobile station may further comprise a means for continuing the synchronization establishment operation in the case where the synchronization of the uplink individual channel or downlink individual channel has not been established at the third timing. The mobile station may further comprise a means for continuing the synchronization establishment operation by continuing the transmission of the uplink individual channel or reception of the downlink individual channel in the case where the synchronization of the uplink individual channel or downlink individual channel has not been established at the third timing. The base station may further comprise a means for continuing the synchronization establishment operation by continuing the transmission of the downlink individual channel or reception of the uplink individual channel in the case where the synchronization of the uplink individual channel or downlink individual channel has not been established at the third timing.

According to the present invention, there is provided a base station for performing data transmission/reception with one or more mobile stations using a wireless link set between them, comprising: a means for transmitting a downlink individual channel to the mobile station; a means for starting synchronization establishment operation of an uplink individual channel in response to transmission of the uplink individual channel from the mobile station to the own station; a means for performing transmission/reception of data to be transmitted in the case where the synchronization between the uplink individual channel and downlink individual channel has been established at a first timing of a specified cycle previously set and the data to be exchanged with the mobile station exists; a means for suspending data transmission/reception for the mobile station in the case where the synchronization between the uplink individual channel and downlink individual channel has been established at the first timing and the data to be exchanged with the mobile station does not exist; and a means for continuing the synchronization establishment operation by continuing the transmission of the downlink individual channel or reception of the uplink individual channel in the case where the synchronization of the uplink individual channel or downlink individual channel has not been established at the first timing.

According to the present invention, there is provided a first mobile station for performing data transmission/reception with a base station using a wireless link set between them, comprising: a means for starting synchronization establishment operation of a downlink individual channel transmitted from the base station at a first timing of a specified cycle previously set; a means for starting transmission of an uplink individual channel to the base station at the time when the synchronization of the downlink has been established; a means for performing transmission/reception of data to be transmitted in the case where the synchronization between the uplink individual channel and downlink individual channel has been established at a second timing of a specified cycle previously set and the data to be exchanged with the base station and exists; a means for suspending at least one of the transmission of the uplink individual channel or reception of the downlink individual channel in the case where the synchronization between the uplink individual channel and downlink individual channel has been established at the second timing and the data to be exchanged with the base station does not exist; and a means for continuing the synchronization establishment operation by continuing the transmission of the uplink individual channel or reception of the downlink individual channel in the case where the synchronization of the uplink individual channel or downlink individual channel has not been established at the second timing.

According to the present invention, there is provided a second mobile station for performing data transmission/reception with a base station using a wireless link set between them, comprising: a means for transmitting an uplink individual channel to the base station; a means for starting synchronization establishment operation of a downlink individual channel transmitted from the base station at a first timing of a specified cycle previously set; a means for performing transmission/reception of data to be transmitted in the case where the synchronization between the uplink individual channel and downlink individual channel has been established at a second timing of a specified cycle previously set and the data to be exchanged with the base station exists; a means for suspending at least one of the transmission of the uplink individual channel or reception of the downlink individual channel in the case where the synchronization between the uplink individual channel and downlink individual channel has been established at the second timing and the data to be exchanged with the base station does not exist; and a means for continuing the synchronization establishment operation by continuing the transmission of the uplink individual channel or reception of the downlink individual channel in the case where the synchronization of the uplink individual channel or downlink individual channel has not been established at the second timing.

According to the present invention, there is provided a first wireless communication method for use in a mobile communication system comprising a base station and a mobile station which performs data transmission/reception with the base station using a wireless link set between them, the method comprising: a step in which the base station transmits a downlink individual channel to the mobile station; a step in which the base station starts synchronization establishment operation of an uplink individual channel in response to transmission of the uplink individual channel from the mobile station to the base station; the mobile station starts synchronization establishment operation of the downlink individual channel at a second timing of a specified cycle previously set; a step in which the mobile station starts transmission of the uplink individual channel to the base station at the time when the synchronization of the downlink has been established; a step in which the base station and mobile station perform transmission/reception of data to be transmitted in the case where the synchronization between the uplink individual channel and downlink individual channel has been established at a third timing of a specified cycle previously set and the data to be transmitted between the base station and the mobile station exists; a step in which the mobile station suspends at least one of the transmission of the uplink individual channel or reception of the downlink individual channel in the case where the synchronization between the uplink individual channel and downlink individual channel has been established at the third timing and the data to be transmitted between the base station and the mobile station does not exist; and a step in which when the synchronization of the uplink individual channel or the downlink individual channel has not been established at the third timing, either or both of the base station and the mobile station continue the synchronization establishment operation.

In the first wireless communication method according to the present invention, the base station and mobile station may continue the synchronization establishment operation in the case where the synchronization of the uplink individual channel or downlink individual channel has not been established at the third timing. The mobile station may continue the synchronization establishment operation by continuing the transmission of the uplink individual channel or reception of the downlink individual channel in the case where the synchronization of the uplink individual channel or downlink individual channel has not been established at the third timing. The base station may continue the synchronization establishment operation by continuing the transmission of the downlink individual channel or reception of the uplink individual channel in the case where the synchronization of the uplink individual channel or downlink individual channel has not been established at the third timing.

According to the present invention, there is provided a second wireless communication method for use in a mobile communication system comprising a base station and a mobile station which performs data transmission/reception with the base station using a wireless link set between them, the method comprising: a step in which the base station transmits a downlink individual channel to the mobile station; the base station starts synchronization establishment operation of an uplink individual channel transmitted from the mobile station to the base station at a first timing of a specified cycle previously set; a step in which the mobile station transmits of the uplink individual channel to the base station; a step in which the mobile station starts synchronization establishment operation of the downlink individual channel at a second timing of a specified cycle previously set; a step in which the base station and mobile station perform transmission/reception of data to be transmitted in the case where the synchronization between the uplink individual channel and downlink individual channel has been established at a third timing of a specified cycle previously set and the data to be transmitted between the base station and the mobile station exists; a step in which the mobile station suspends at least one of the transmission of the uplink individual channel or reception of the downlink individual channel in the case where the synchronization between the uplink individual channel and downlink individual channel has been established at the third timing and the data to be transmitted between the base station and the mobile station does not exist; and when the synchronization of the uplink individual channel or the downlink individual channel has not been established at the third timing, either or both of the base station and the mobile station continue the synchronization establishment operation.

In the second wireless communication method according to the present invention, the base station and mobile station may continue the synchronization establishment operation in the case where the synchronization of the uplink individual channel or downlink individual channel has not been established at the third timing. The mobile station may continue the synchronization establishment operation by continuing the transmission of the uplink individual channel or reception of the downlink individual channel in the case where the synchronization of the uplink individual channel or downlink individual channel has not been established at the third timing. The base station may continue the synchronization establishment operation by continuing the transmission of the downlink individual channel or reception of the uplink individual channel in the case where the synchronization of the uplink individual channel or downlink individual channel has not been established at the third timing.

That is, in the mobile communication system according to the present invention, the base station transmits a downlink individual channel to the mobile station, and the mobile station starts synchronization establishment operation of the downlink individual channel at a first timing of a specified cycle previously set and starts transmission of an uplink individual channel to the base station in the case where the synchronization has been established.

Further, in the mobile communication system according to the present invention, transmission/reception of data to be transmitted is performed in the case where the synchronization between the uplink individual channel and downlink individual channel has been established at a second timing of a specified cycle previously set and the data to be transmitted between the base station and mobile station exists.

Further, in the mobile communication system according to the present invention, the mobile station suspends transmission of the uplink individual channel or reception of the downlink individual channel in the case where the synchronization between the uplink individual channel and downlink individual channel has been established at the second timing and the data to be transmitted between the base station and mobile station does not exist.

Further, in the mobile communication system according to the present invention, synchronization establishment operation is continued in the case where the synchronization of the uplink individual channel or downlink individual channel has not been established at the second timing.

In the wireless communication method according to the present invention, the base station transmits a downlink individual channel to the mobile station, and the mobile station starts synchronization establishment operation of the downlink individual channel at a first timing of a specified cycle previously set and starts transmission of an uplink individual channel to the base station in the case where the synchronization has been established.

Further, in the wireless communication method according to the present invention, transmission/reception of data to be transmitted is performed in the case where the synchronization between the uplink individual channel and downlink individual channel has been established at a second timing of a specified cycle previously set and the data to be transmitted between the base station and mobile station exists.

Further, in the wireless communication method according to the present invention, the mobile station suspends transmission of the uplink individual channel or reception of the downlink individual channel in the case where the synchronization between the uplink individual channel and downlink individual channel has been established at the second timing and the data to be transmitted between the base station and mobile station does not exist.

Further, in the wireless communication method according to the present invention, synchronization establishment operation is continued in the case where the synchronization of the uplink individual channel or downlink individual channel has not been established at the second timing.

The base station according to the present invention transmits a downlink individual channel to the mobile station and performs transmission/reception of data to be transmitted in the case where the synchronization between the uplink individual channel and downlink individual channel has been established at a second timing of a specified cycle T and the data to be exchanged with the mobile station exists.

The base station according to the present invention suspends the transmission/reception of data to the mobile station in the case where the synchronization of the uplink individual channel and downlink individual channel has been established at the second timing of the specified cycle T and the data to be exchanged with the mobile station does not exists.

Further, the base station according to the present invention continues the synchronization establishment operation by continuing the transmission of the uplink individual channel or reception of the downlink individual channel in the case where the synchronization of the uplink individual channel or downlink individual channel has not been established at the second timing.

The mobile station according to the present invention sets a wireless link between itself and the base station, starts synchronization establishment operation of a downlink individual channel that the base station transmits at a first timing set in a specified cycle, and starts transmission of an uplink individual channel when the synchronization of the downlink has been established.

The mobile station according to the present invention performs transmission/reception of data to be transmitted in the case where the synchronization between the uplink individual channel and downlink individual channel has been established at a second timing set in a specified cycle and the data to be exchanged with the base station exists.

Further, the mobile station according to the present invention suspends the transmission of the uplink individual channel or reception of the downlink individual channel in the case where the synchronization between the uplink individual channel and downlink individual channel has been established at the second timing and the data to be exchanged with the base station does not exist.

Further, the mobile station according to the present invention continues the synchronization establishment operation by continuing the transmission of the uplink individual channel or reception of the downlink individual channel in the case where the synchronization of the uplink individual channel or downlink individual channel has not been established at the second timing.

With the above configuration, in the present invention, the transmission/reception state update information indicating whether the mobile station can receive a packet is transmitted from the base station to the mobile station to set active state in which the control information for packet transmission can be received by the mobile station or suspend state in which the control information for packet transmission cannot be received by the mobile station. As a result, the mobile station enters the suspend state at the time other than packet reception time or transmission/reception time of the individual channel data, so that it is possible to reduce the power consumption of the mobile station.

In particular, in the packet communication where data is transmitted in a burst manner and therefore the ratio of the time in which data transmission is not performed is high, the effect of reducing the power consumption of the mobile station, which is obtained by suspending the transmission/reception, is large.

Further, in the present invention, even if the synchronization cannot be established within a predetermined synchronization establishment interval, the synchronization establishment operation can be continued. As a result, it is possible to establish the synchronization even in bad propagation environment where synchronization establishment is difficult in a short time. Therefore, in the present invention, it is possible to notify the mobile station of the state update information, thereby reducing the delay of packet transmission and increasing throughput.

BRIEF DESCRIPTION OF THE DRAWINGS

FIG. 7 is a flowchart showing an operation of the mobile station of FIG. 3;

FIG. 8 is a flowchart showing an operation of the mobile station of FIG. 3;

FIG. 9 is a view for explaining a communication method according to a second example of the present invention; and FIG. 10 is a view for explaining a communication method according to a third example of the present invention.

BEST MODE FOR CARRYING OUT THE INVENTION

An embodiment of the present invention will be described with reference to the accompanying drawings.

Figure 1:
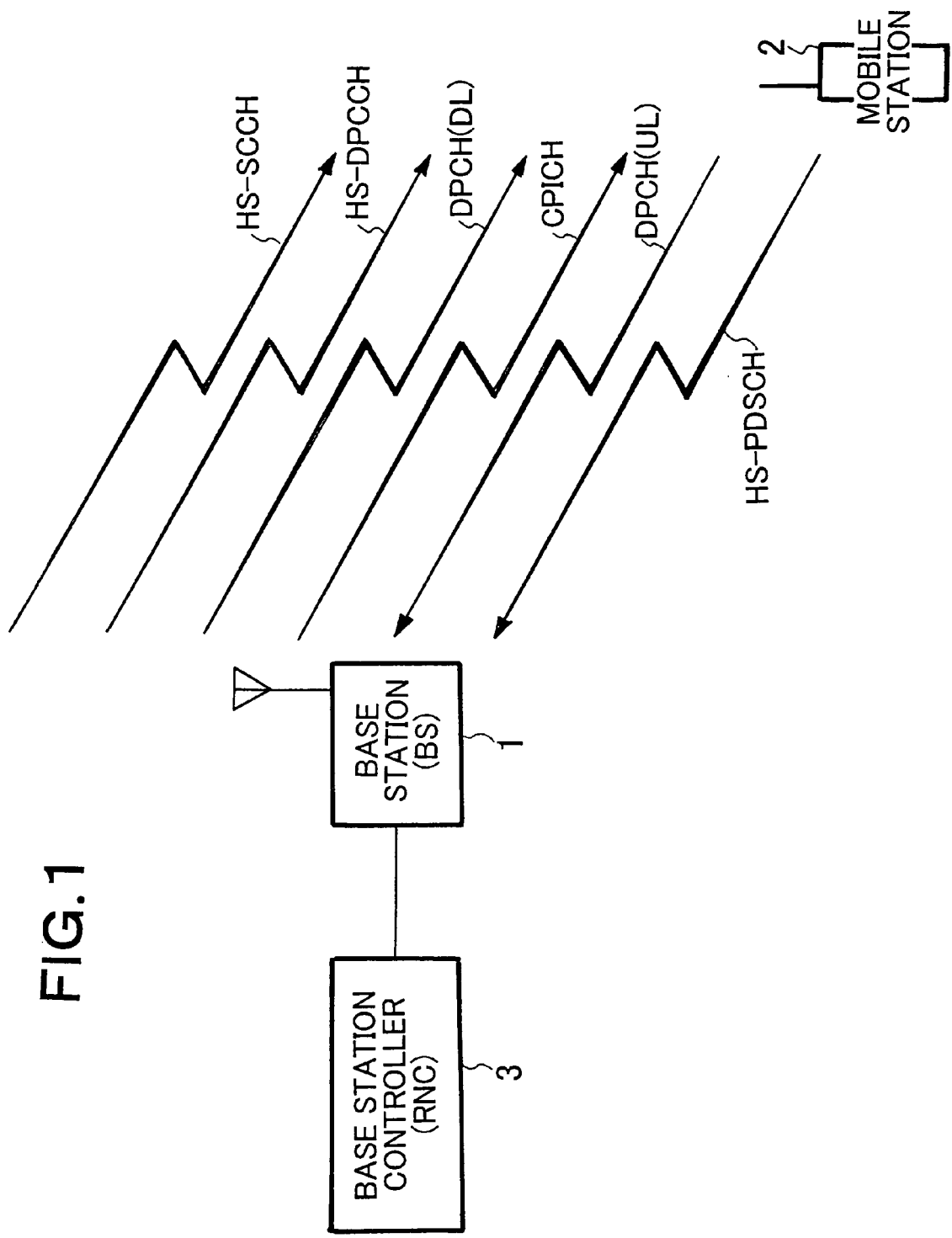
FIG. 1 is a block diagram showing a configuration of a mobile communication system according to an embodiment of the present invention.

FIG. 1 is a block diagram showing a configuration of a mobile communication system according to an embodiment of the present invention. As shown in FIG. 1, the mobile communication system according to the embodiment of the present invention includes a base station 1, a mobile station 2, and a base station controller (an RNC (Radio Network Controller), etc.) 3.

The mobile station 2 constantly receives specified four HS-SCCH (High Speed Shared Control Channel) channels from the base station 1 to detect information related to a mobile station ID (Identifier) included in the HS-SCCH, and determines whether the information of the mobile station ID corresponds to the own mobile station ID.

When detecting the own mobile station ID on the HS-SCCH, the mobile station 2 uses control information transmitted on the HS-SCCH to receive HS-PDSCH (High Speed Physical Downlink Shared Channel) which is transmitted a predetermined time after the HS-SCCH.

In the embodiment of the present invention, the base station 1 uses the HS-SCCH to notify the mobile station 2 of not only the control information, but also transmission/reception state update information for specifying a state (Active/Suspend) in a previously set state update frame (for example, unit frame in which state control for the mobile station 2 is performed in a cycle of 100 sec). More specifically, the transmission/reception state update information is a signal notifying a state in the current state update frame of the mobile station 2 and is hereinafter referred to as "state update information".

"Active" is a state where the mobile station 2 is allowed to receive a normal HSDPA (High-Speed Downlink Packet Access), that is, the mobile station 2 is allowed to receive control information needed for a packet transmission. In "Active" state, power supply for all circuits is turned ON. On the other hand, "Suspend" is a state where the mobile station 2 is not allowed to receive the HSDPA, in which the mobile station 2 is in a power consumption reduction mode. In the power consumption reduction mode, power supply to the circuits involved in the reception of the HSDPA is turned OFF.

Thus, in the mobile station 2, based on the state update information transmitted at a predetermined cycle (specified interval) from the base station 1, the above state (mode) in the state update frame is set.

As described above, the mobile station 2 enters the suspend state at the time other than packet reception time or transmission/reception time of data to be transmitted on the individual channel (hereinafter, referred to as "individual channel data") [control information of layers higher than L (Layer) 1 (various kinds of control information of an application, channel changeover, handover, or the like)] among user data, higher layer control information, or the like, so that it is possible to promptly transmit a packet when data transmission is requested while reducing the power consumption in the packet wait state.

In the suspend state, the base station 1 and the mobile station 2 start synchronization establishment operation of a wireless link at a predetermined timing in order to exchange the state update information between them. In the synchronization establishment operation, the base station 1 and mobile station 2 receive pilot signals transmitted on a uplink individual channel and downlink individual channel respectively and detect, at receiving sides, frame start timing or slot start timing, which is previously set in the pilot signal as a known pattern to control the reception timing.

In the embodiment of the present invention, if the synchronization cannot be established within a prescribed synchronization establishment time, at least one of the base station 1 and mobile station 2 continues the synchronization establishment operation. This increases the possibility that the synchronization establishment of a wireless link can be completed by the next state update information notification timing, reducing packet transmission delay due to failure of the synchronization establishment, with the result that throughput of the HSDPA service can be increased.

Figure 2:
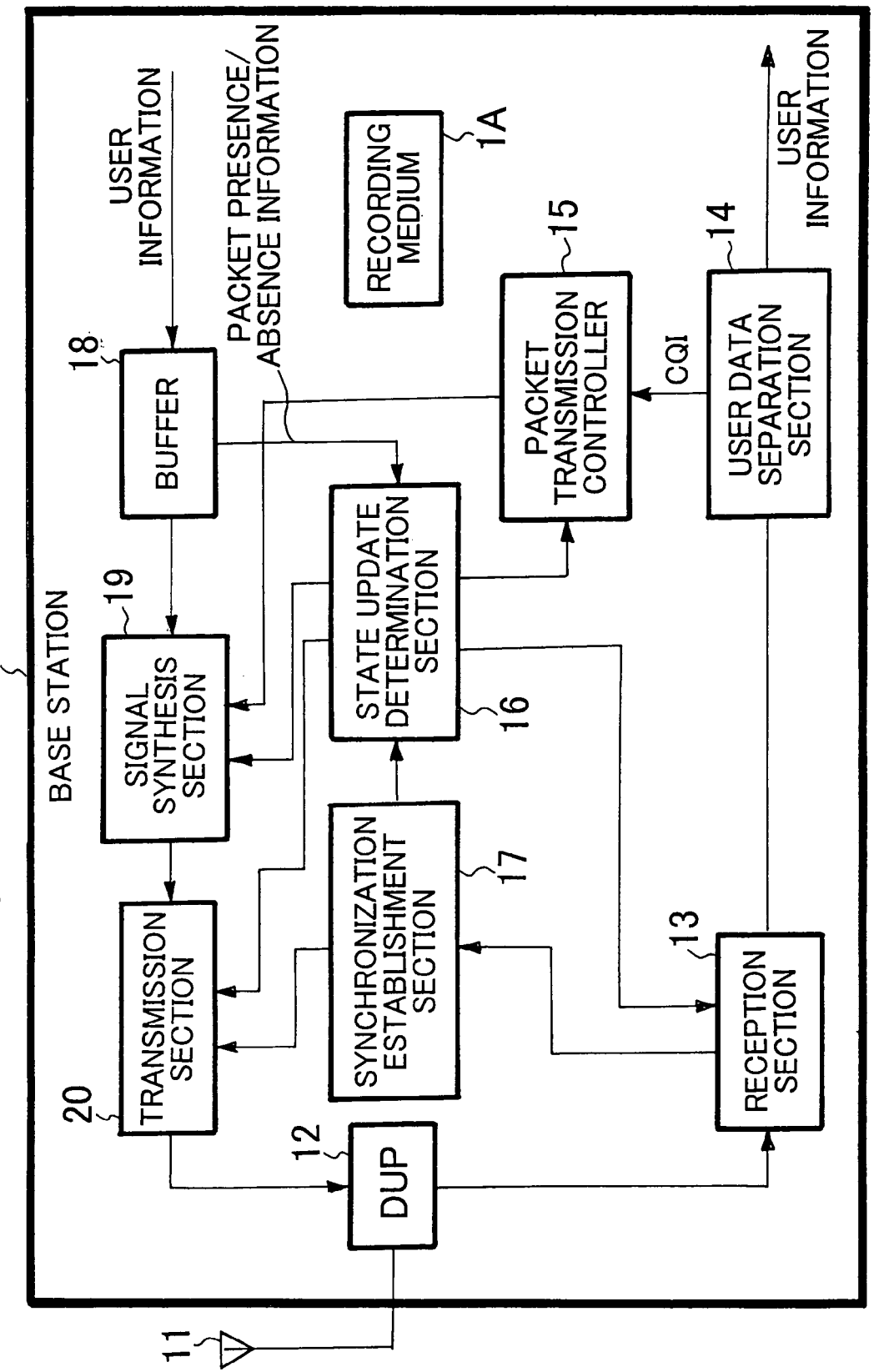
FIG. 2 is a block diagram showing a configuration of a base station according to a first example of the present invention.

FIG. 2 is a block diagram showing a configuration of the base station according to a first example of the present invention. As shown in FIG. 2, the base station 1 includes an antenna 11, a DUP (duplexer) 12, a reception section 13, a user data separation section 14, a packet transmission controller 15, a state update determination section 16, a synchronization establishment section 17, a buffer 18, a signal synthesis section 19, a transmission section 20, and a recording medium 1A. Known techniques can be applied to the call control section, voice input/output section, and display section of the base station 1, and descriptions of the configuration and operation thereof will be omitted.

The reception section 13 receives a signal [DPCH (UL) or the like which is an uplink individual channel] through the antenna 11 and DUP 12 and sends it to the user data separation section 14.

The user data separation section 14 separates the reception signal from the reception section 13 into user information (voice signal, image signal, or the like) and control information [CQI (Channel Quality Indication: downlink quality information) information or the like]. The user data separation section 14 then sends the user information to the abovementioned call control section, voice input/output section, and display section of the base station 1 and sends the control information to the packet transmission controller 15.

The packet transmission controller 15 performs transmission control for the packet that has temporarily been stored in the buffer 18 based on the CQI information from the user data separation section 14 and active mobile station information from the state update determination section 16.

The state update determination section 16 determines whether to set the mobile station 2 to "Active" or "Suspend" based on the packet presence/absence information that has been temporarily stored in the buffer 18. According to the determination result, the state update determination section 16 sends the active mobile station information, a state update information signal (state update information for mobile station 2), and an individual channel transmission/reception ON/OFF signal to the packet transmission controller 15, signal synthesis section 19, and reception section 13 and transmission section 20, respectively.

The synthesis establishment section 17 instructs the transmission section 20 to transmit the DPCH (DL) which is a downlink individual channel at a predetermined synchronization establishment interval start time in "suspend" state of the own station, monitors the presence/absence of the DPCH (UL) which is a uplink individual channel in outputs of the reception section 13. When detecting transmission of the DPCH (UL), the synthesis establishment section 17 starts the uplink synchronization establishment operation. The synthesis establishment section 17 notifies the state update determination section 16 whether the uplink synchronization establishment has been succeeded within a predetermined synchronization establishment interval. If the synchronization establishment has failed, the synthesis establishment section 17 instructs the transmission section 20 to continue the transmission of the DPCH (DL).

The buffer 18 temporarily stores the user information (packet). The signal synthesis section 19 synthesizes the user information (packet) temporarily stored in the buffer 18, the state update information signal from the state update determination section 16, and the like and transmits it from the antenna 11 through the transmission section 20 and DUP 12 as the HS-SCCH, DPCH (DL), HS-PDSCH.

The recording medium 1A stores a program (computer executable program) for realizing processes of the above sections (in particular, packet transmission controller 15, state update determination section 16, synchronization establishment section 17, etc.) of the base station 1.

Figure 3:
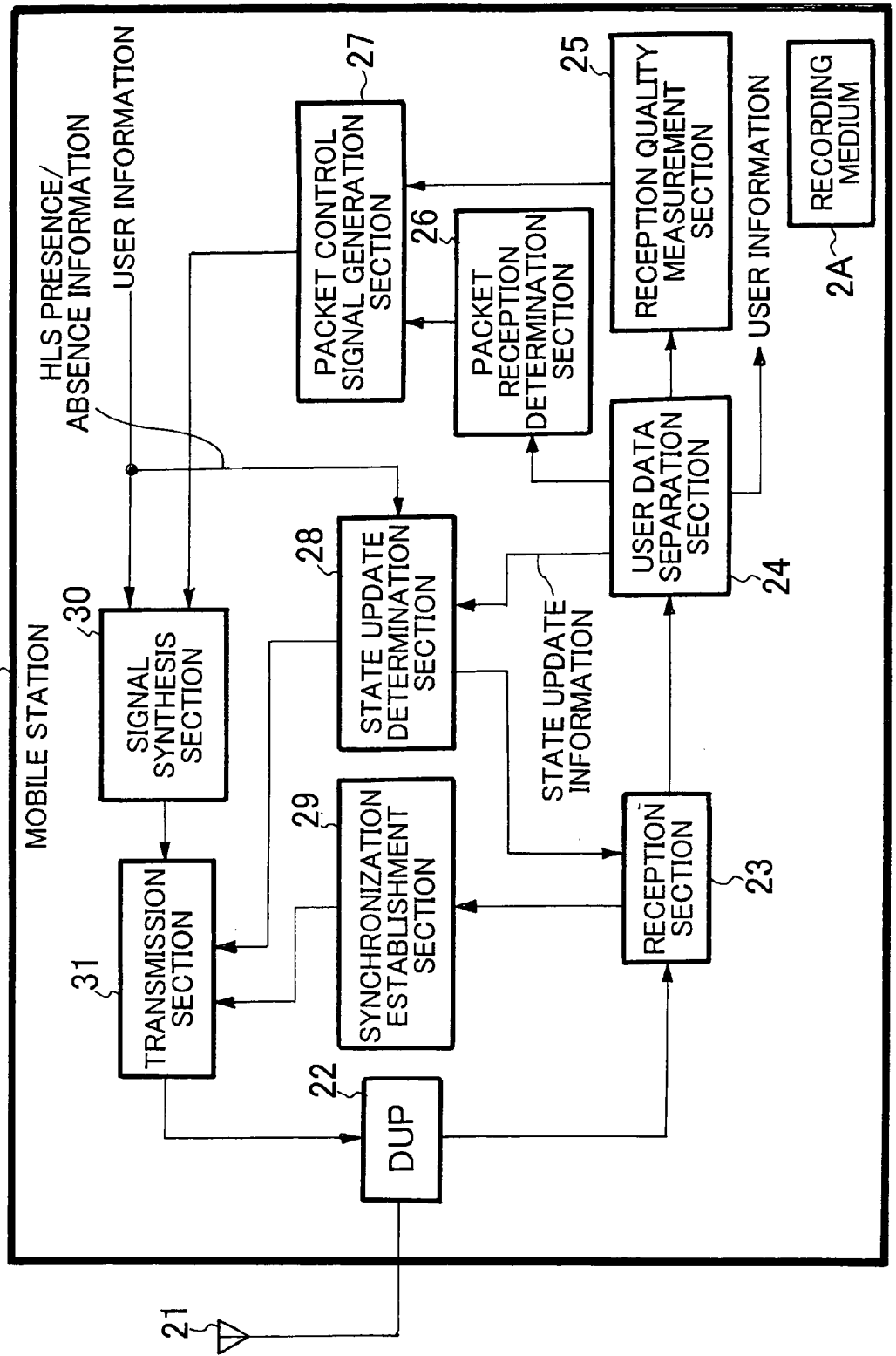
FIG. 3 is a block diagram showing a configuration of a mobile station according to a first example of the present invention.

FIG. 3 is a block diagram showing a configuration of the mobile station according to the first example of the present invention. As shown in FIG. 3, the mobile station 2 includes an antenna 21, a DUP 22, a reception section 23, a user data separation section 24, a reception quality measurement section 25, a packet reception determination section 26, a packet control signal generation section 27, a state update determination section 28, a synchronization establishment section 29, a signal synthesis section 30, a transmission section 31, and a recording medium 2A. Known techniques can be applied to the call control section, voice input/output section, and display section of the mobile station 2, and descriptions of the configuration and operation thereof will be omitted.

The reception section 23 receives a signal [CPICH (Common Pilot Channel), DPCH (DL) which is a downlink individual channel, and HS-PDSCH] through the antenna 21 and DUP 22 and sends them to the user data separation section 24.

The user data separation section 24 separates the reception signal from the reception section 23 into user information (voice signal, image signal, or the like) and control information. The user data separation section 24 then sends the user information to the abovementioned call control section, voice input/output section, and display section of the mobile station 2 and sends the control information to the packet reception determination section 26 and state update determination section 28.

The reception quality measurement section 25 measures the reception quality [Ec/Io (energy per chip/interference power per unit frequency)] of the CPICH from the reception section 23 and outputs the measurement result to the packet control signal generation section 27.

The packet reception determination section 26 determines the presence/absence of control information (signal for notifying packet transmission timing) of the HS-SCCH, or determines whether a packet from the base station 1 has normally been received or not based on the control information from the user data separation section 24 and outputs the determination result to the packet control signal generation section 27.

The packet control signal generation section 27 generates ACK/NACK (Acknowledgement/Negative Acknowledgements) which is acknowledge information of a received packet based on the determination result send from the packet reception determination section 26 and CQI information based on the measurement result from the reception quality measurement section 25 and outputs them to the signal synthesis section 30.

The state update determination section 28 determines a state (Active/Suspend) in the state update frame based on the control information from the user data separation section 24 and presence/absence information related to the individual channel data within user information to be input to the signal synthesis section 30 and notifies the reception section 23 and transmission section 31 of the determined state.

The synchronization establishment section 29 allows the reception section 23 to receive the DPCH (DL) which is the downlink individual channel at a predetermined synchronization establishment interval start time in "suspend" state of the own station to start the synchronization establishment operation. When the synchronization has been established, the synchronization establishment section 29 instructs the transmission section 31 to start transmission of the DPCH (UL) which is an uplink individual channel. If downlink synchronization establishment has failed within a predetermined synchronization establishment interval, the synchronization establishment section 29 continues the synchronization establishment operation and instructs the transmission section 31 to start transmission of the DPCH (UL) at the time point when the synchronization of the DPCH (DL) has been established.

The signal synthesis section 30 synthesizes the information (ACK/NACK, CQI) from the packet control signal generation section 27 and input signals from outside, such as the call control section, voice input section of the mobile station 2, and the like and transmits it from the antenna 21 through the transmission section 31 and DUP 22 as the DPCH (UL) and HS-DPCCH.

The recording medium 2A stores a program (computer executable program) for realizing processes of the above sections (in particular, packet reception determination section 26, packet control signal generation section 27, state update determination section 28, synchronization establishment section 29, etc.) of the mobile station 2.

Figure 4:
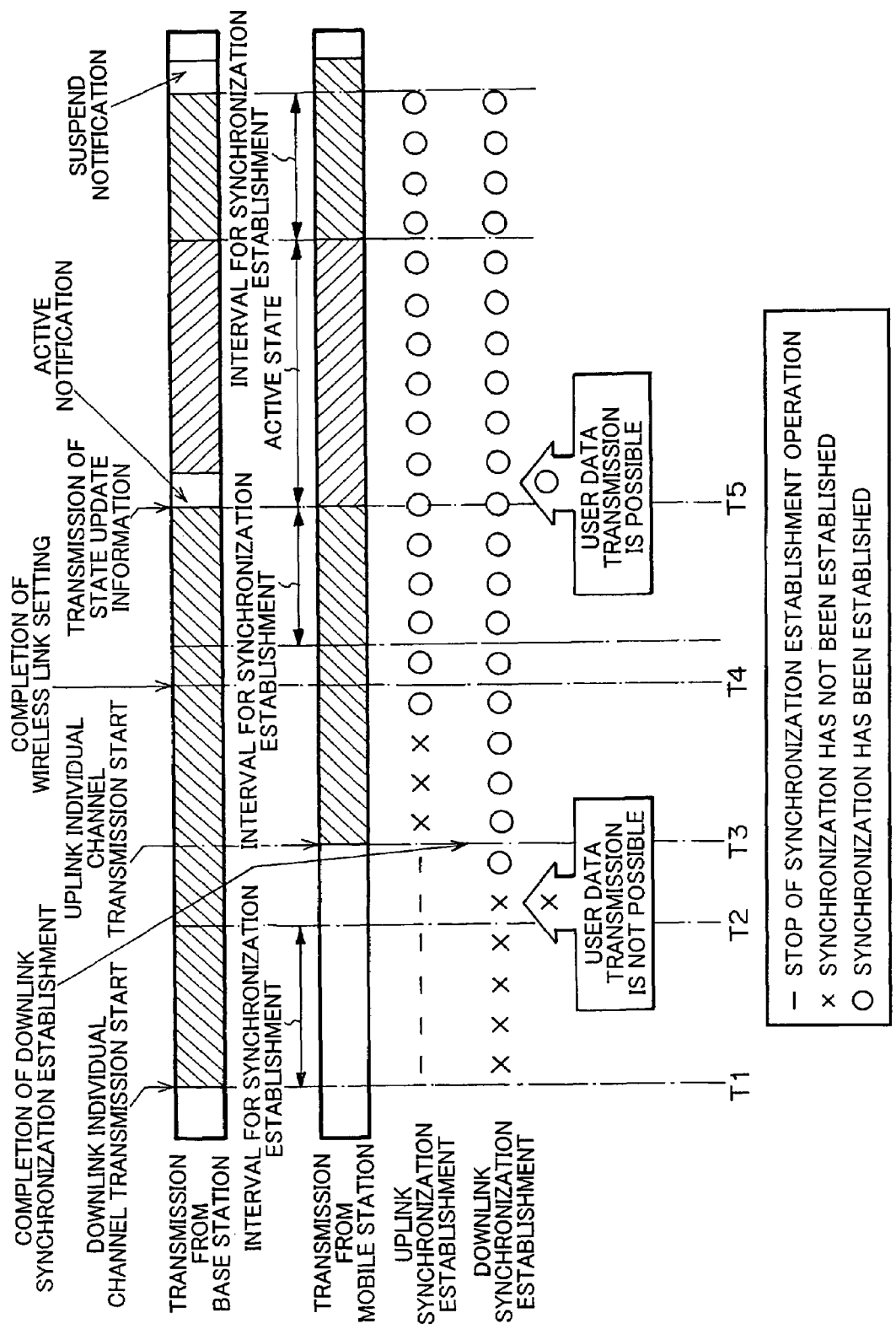
FIG. 4 is a view showing signals exchanged between the base station of FIG. 2 and mobile station of FIG. 3.

FIG. 4 is a view showing signals exchanged between the base station 1 of FIG. 2 and the mobile station 2 of FIG. 3.

With reference to FIG. 4, an operation of the mobile communication system according to the first example of the present invention will be described.

In the first example, the base station 1 starts transmission of DPCH (DL) which is a downlink individual channel at a predetermined synchronization establishment interval start time (timing T1 in FIG. 4). The mobile station 2 receives the DPCH (DL) which is an uplink individual channel and starts synchronization establishment operation. If, however, the synchronization of the DPCH (DL) has not been established by the synchronization establishment end time (timing T2 in FIG. 4), the mobile station 2 continues the synchronization establishment operation.

If the base station 1 cannot detect the transmission of the DPCH (UL) at the synchronization establishment interval end time (timing T2 in FIG. 4), it continues the transmission of the DPCH (DL) to the mobile station 2 and suspends transmission of the state update information to the mobile station and transmission of the user data or higher layer control signal on the DPCH (DL) to the mobile station until the DPCH (UL) transmission is detected.

When the synchronization of the DPCH (DL) has been established (timing T3 in FIG. 4), the mobile station 2 starts the transmission of the DPCH (UL). When detecting the transmission of the DPCH (UL) from the mobile station 2, the base station 1 starts synchronization establishment operation and starts transmission of the user data or higher layer control signal on the DPCH (DL), if exists.

When the synchronization of the DPCH (UL) has been completed (timing T4 in FIG. 4), the base station 1 transmits state update information to the mobile station at the next state update information transmission timing (timing T5 in FIG. 4). If user data or higher layer control signal to be transmitted to the mobile station 2 exists, the base station 1 transmits an active notification to the mobile station 2 and starts the transmission of the user data or like.

If the user data or control signal to be transmitted to the mobile station 2 does not exist, the base station 1 transmits a suspend notification to the mobile station 2 at the state update information transmission timing. As a result, the base station 1 and mobile station 2 stop the transmission/reception of the DPCH (DL/UL), HS-SCCH, HS-PDSCH, and HS-DPCCH.

Figure 5:
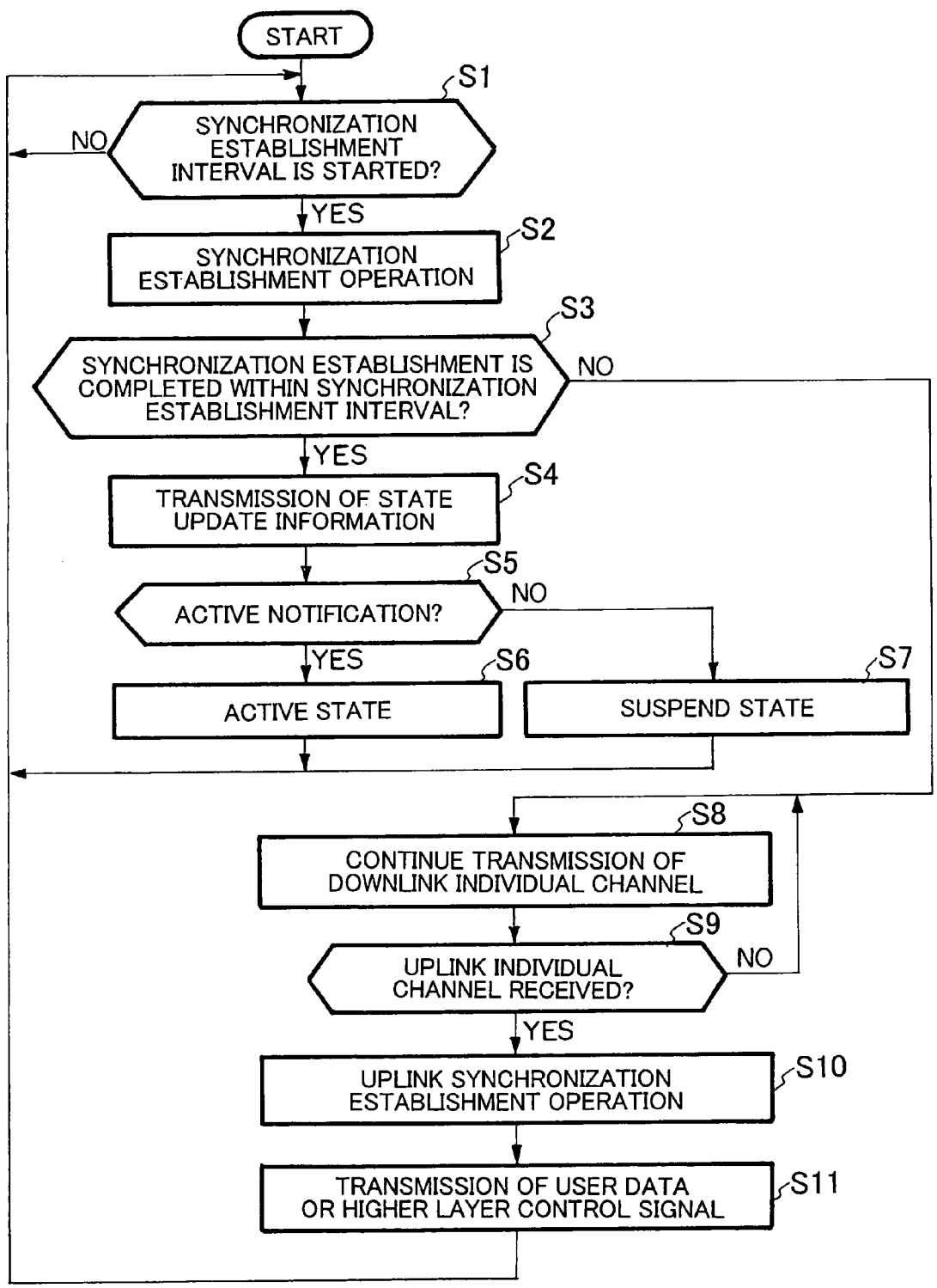
FIG. 5 is a flowchart showing an operation of the base station of FIG. 2.
Figure 6:
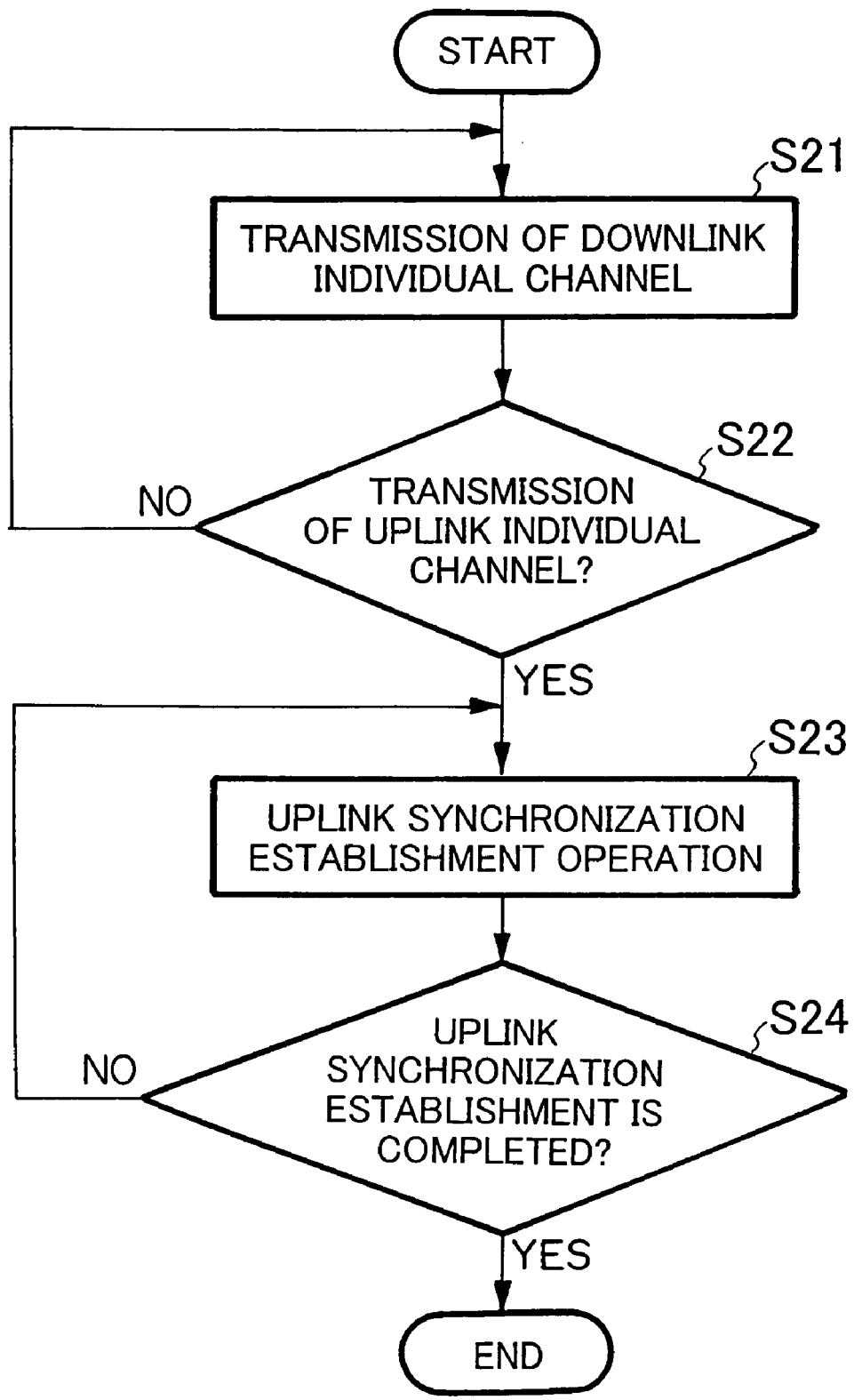
FIG. 6 is a flowchart showing an operation of the base station of FIG. 2.

FIGS. 5 and 6 are flowcharts each showing the operation of the base station 1 of FIG. 2, and FIGS. 7 and 8 are flowcharts each showing the operation of the mobile station 2 of FIG. 3. With reference to FIGS. 1 to 8, the operation of the mobile communication system (base station 1 and mobile station 2) according to the first example of the present invention will be described. The processes shown in FIGS. 5 and 6 are realized by a program in the recording medium 1A executed by the base station 1 and the processes shown in FIGS. 7 and 8 are realized by a program in the recording medium 2A executed by the mobile station 2.

At synchronization establishment interval start timing (step S1 in FIG. 5), the base station 1 starts the synchronization establishment operation shown in FIG. 6 (step S2 in FIG. 5).

In FIG. 6, the base station 1 starts transmission of a downlink individual channel (step S21 in FIG. 6) and monitors an uplink individual channel to be transmitted from the mobile station 2. Upon receiving the uplink individual channel from the mobile station 2 (step S22 in FIG. 6), the base station 1 starts uplink synchronization establishment operation (step S23 in FIG. 6). When the uplink synchronization has been established (step S24 in FIG. 6), the base station 1 completes the synchronization establishment operation of the wireless link.

When the above synchronization establishment operation has been completed within a synchronization establishment interval (step S3 in FIG. 5), the base station 1 transmits state update information to the mobile station 2 (step S4 in FIG. 5). If, at this time, there is any data to be transmitted to the mobile station 2, the base station 1 transmits an active notification (steps S5 and S6 in FIG. 5) and starts data exchange with the mobile station 2 after scheduling the transmission to the mobile station 2.

If there is no data to be transmitted to the mobile station 2, the base station 1 transmits a suspend notification (steps S5 and S6 in FIG. 5). In this case, the base station 1 does not perform the scheduling for the mobile station 2.

When the above synchronization establishment operation has not been completed within a synchronization establishment interval (step S3 in FIG. 5), the base station 1 continues the transmission of the downlink individual channel for the mobile station 2 (step S8 in FIG. 5). The base station 1 monitors the uplink individual channel to be transmitted from the mobile station 2. Upon receiving the uplink individual channel (step S9 in FIG. 5), the base station 1 starts the uplink synchronization establishment operation (step S10 in FIG. 5).

At the same time, the base station 1 starts transmission of user data or higher layer control signal on the downlink individual channel (step S11 in FIG. 5). The base station 1 performs the above operation every state update timing which has been set in a predetermined cycle.

On the other hand, at a predetermined synchronization establishment interval start timing (step S31 in FIG. 7), the mobile station 2 starts the synchronization establishment operation of the wireless link (FIG. 8) (step S32 in FIG. 7).

In FIG. 8, the mobile station 2 receives the downlink individual channel transmitted from the base station 1 and performs downlink synchronization establishment (step S41 in FIG. 8). When the downlink synchronization establishment has been completed (step S42 in FIG. 8), the mobile station 2 starts transmission of an uplink individual channel (step S43 in FIG. 8).

When the above synchronization establishment operation has been completed within a predetermined synchronization establishment interval (step S33 in FIG. 7), the mobile station 2 receives state update information transmitted in a predetermined timing (step S34 in FIG. 7). When the state update information indicates active state, (step S35 in FIG. 7), the mobile station 2 enters the active state (step S36 in FIG. 7). The active state is a state where the DPCH (DL/UL) which downlink/uplink individual channels, HS-SCCH, HS-PDSCH, and HS-DPCCH can be exchanged.

When the above synchronization establishment operation has not been completed within a predetermined synchronization establishment interval (step S33 in FIG. 7), the mobile station 2 receives the downlink individual channel to continue the synchronization establishment operation (S38 in FIG. 7). When the downlink synchronization has been established (step S39 in FIG. 7), the mobile station 2 starts transmission of an uplink individual channel (step S40 in FIG. 7).

The mobile station 2 performs the above operation every state update timing which has been set in a predetermined cycle.

As described above, according to the first example, the mobile station 2 enters the suspend state at the time other than packet reception time or transmission/reception time of the individual channel data, so that it is possible to reduce the power consumption of the mobile station 2. In particular, in the packet communication where data is transmitted in a burst manner and therefore the ratio of the time in which data transmission is not performed is high, the effect of reducing the power consumption of the mobile station 2, which is obtained by suspending the transmission/reception, is large.

In the first example, even if the synchronization has not been established within the synchronization establishment interval, the time of the synchronization establishment operation can be extended until the end of the next synchronization establishment interval. Therefore, synchronization can be established even in bad propagation environment where synchronization establishment is difficult in a short time.

Therefore, in the first example, it is possible to increase the possibility that the transmission/reception state update information reaches the mobile station 2. As a result, in this example, it is possible to reduce the delay of packet transmission, thereby increasing throughput of the HSDPA.

Further, in the first example, the transmission of the DPCH (UL) is started after the completion of the synchronization establishment of the DPCH (DL), the base station 1 can determine whether the synchronization of the DPCH (DL) has been established or not based on the presence/absence of the reception of the DPCH (UL).

Therefore, in the first example, it is possible to transmit user data or higher layer control signal to be transmitted on the DPCH (DL) after confirmation of the synchronization establishment of the DPCH (DL), which increases the possibility that the mobile station 2 receives the above signals correctly.

Further, in the first example, the start of the DPCH (DL) transmission can notify the base station 1 of the completion of the synchronization establishment of the DPCH (DL), reducing signaling for the DPCH (DL) synchronization establishment completion notification, resulting in effective use of the uplink.

FIG. 9 is a view for explaining a communication method according to a second example of the present invention. In the second example of the present invention, as can be seen from FIG. 4 and FIG. 9, while the DPCH (UL) which is an uplink individual channel is transmitted after the synchronization of the DPCH (DL) which is a downlink individual channel has been established in the first example of the present invention, transmission of DPCH (DL/UL) which are downlink/uplink individual channels is started at the time (timing T6 in FIG. 9) immediately after the start of a predetermined synchronization establishment interval. Note that the configurations of the base station and mobile station according to the second example of the present invention are the same as those according to the first example (FIGS. 2 and 3).

The base station in the second example of the present invention cannot accordingly determine whether the synchronization of the DPCH (DL) has been established or not based on the reception of the DPCH (UL). Instead, when the synchronization of the DPCH (DL) has been established, the mobile station transmits a downlink synchronization establishment completion notification (timing T8 in FIG. 9). Further, when the synchronization of the DPCH (UL) has been established, the base station transmits an uplink synchronization establishment completion notification (timing T9 in FIG. 9). Other operations are the same as those in the first example of the present invention.

As described above, according to the second example, the mobile station enters the suspend state at the time other than packet reception time or transmission/reception time of the individual channel data, so that it is possible to reduce the power consumption of the mobile station. In particular, in the packet communication where data is transmitted in a burst manner and therefore the ratio of the time in which data transmission is not performed is high, the effect of reducing the power consumption of the mobile station, which is obtained by suspending the transmission/reception, is large.

Therefore, in the second example, synchronization can be established even in bad propagation environment where synchronization establishment is difficult in a short time. Thus, it is possible to increase the possibility that the transmission/reception state update information reaches the mobile station. As a result, it is possible to reduce the delay of packet transmission, thereby increasing throughput of the HSDPA.

Further, in the second example, the DPCH (UL) can be transmitted immediately after the start of the synchronization establishment interval, so that it is possible to increase the time needed for establishing the uplink synchronization, thereby increasing the success rate of the uplink synchronization establishment.

Further, in the second example, downlink/uplink synchronization establishment notifications are transmitted, so that it is possible to transmit user data or higher layer control signal to be transmitted on the DPCH after confirmation of the synchronization establishment of the DPCH, which increases the possibility that the above signals can be received correctly.

FIG. 10 is a view for explaining a communication method according to a third example of the present invention. As shown in FIG. 10, in the third example of the present invention, when the synchronization of the DPCH (UL) which is an uplink channel cannot be established within a predetermined synchronization establishment interval, the base station notifies the mobile station of unestablishment of DPCH (UL) synchronization and continues the transmission of the DPCH (DL) which is a downlink individual channel to the mobile station. Note that the configurations of the base station and mobile station according to the third example of the present invention are the same as those of the base station 1 and mobile station 2 according to the first example (FIGS. 2 and 3).

In the third example, in order to give notice of the synchronization unestablishment, the base station transmits an active notification (timing T10 in FIG. 10) as the state update information irrespective of whether a packet to be transmitted to the mobile station occurs or not.

Thus, according to the third example, the mobile station enters the suspend state at the time other than packet reception time or transmission/reception time of the individual channel data, so that it is possible to reduce the power consumption of the mobile station. In particular, in the packet communication where data is transmitted in a burst manner and therefore the ratio of the time in which data transmission is not performed is high, the effect of reducing the power consumption of the mobile station, which is obtained by suspending the transmission/reception, is large.

Further, in the third example, even if the synchronization cannot be established within a predetermined synchronization establishment interval due to bad propagation environment, the synchronization establishment operation can be continued until the next state update information notification timing, thereby increasing the possibility that the synchronization can be established.

Thus, in the third example, it is possible to increase the possibility that the transmission/reception state update information reaches the mobile station. As a result, it is possible to reduce the delay of packet transmission, thereby increasing throughput of the HSDPA.

Further, in the third example, the state update information is used as an unestablishment notification of the DPCH (UL) synchronization to allow the mobile station to continue the synchronization establishment operation. Therefore, the third example has an advantage of eliminating the need of additional individual signal for giving notice of the unestablishment of synchronization.

As described above, in the present invention, the transmission/reception state update information indicating whether the mobile station can receive a packet is transmitted from the base station to mobile station to set active state in which the control information for packet transmission can be received by the mobile station or suspend state in which the control information for packet transmission cannot be received by the mobile station. With the above configuration, the mobile station enters the suspend state at the time other than packet reception time or transmission/reception time of the individual channel data, so that it is possible to reduce the power consumption of the mobile station. In particular, in the packet communication where data is transmitted in a burst manner and therefore the ratio of the time in which data transmission is not performed is high, the effect of reducing the power consumption of the mobile station, which is obtained by suspending the transmission/reception, is large.

Further, in the present invention, even if the synchronization cannot be established within a predetermined synchronization establishment interval, the synchronization establishment operation can be continued. As a result, it is possible to establish the synchronization even in bad propagation environment where synchronization establishment is difficult in a short time. Therefore, in the present invention, it is possible to notify the mobile station of the state update information, thereby reducing the delay of packet transmission and increasing throughput.

As described above, in the present invention having the above configuration and operating in the above manner, the advantage of promptly transmitting a packet when data transmission is requested while reducing the power consumption in the packet wait state can be obtained.

INDUSTRIAL APPLICABILITY

As described above, the present invention is suitably applied to a mobile communication system, a base station, a mobile station, and a wireless communication method for use in the above system and stations and, in particular, to high-speed data transfer such as HSDPA (High-Speed Downlink Packet Access) service.

The invention claimed is:

1. A mobile communication system comprising:
 a base station; and
 a mobile station which performs data transmission/reception with said base station using a wireless link set between them,
 wherein said base station comprises:
 means for transmitting a downlink individual channel to the mobile station;
 means for starting synchronization establishment operation of an uplink individual channel in response to transmission of the uplink individual channel from the mobile station to the base station; and
 means for performing transmission/reception of data to be transmitted in the case where the synchronization between the uplink individual channel and downlink individual channel has been established at a third timing of a specified cycle previously set and the data to be transmitted between the base station and the mobile station exists,
 wherein said mobile station comprises:
 means for starting synchronization establishment operation of the downlink individual channel at a second timing of a specified cycle previously set;
 means for starting transmission of the uplink individual channel to the base station at the time when the synchronization of the downlink has been established;
 means for performing transmission/reception of data to be transmitted in the case where the synchronization between the uplink individual channel and downlink individual channel has been established at the third timing of a specified cycle previously set and the data to be transmitted, between the base station and the mobile station, exists; and
 means for suspending at least one of the transmission of the uplink individual channel or reception of the downlink individual channel in the case where the synchronization between the uplink individual channel and downlink individual channel has been established at the third timing and the data to be transmitted, between the base station and the mobile station, does not exist, and
 wherein when the synchronization of the uplink individual channel or the downlink individual channel has not been established at the third timing, the synchronization establishment operation is continued.

2. The mobile communication system according to claim 1, wherein
 said base station and mobile station further comprise means for continuing the synchronization establishment operation in the case where the synchronization of the uplink individual channel or downlink individual channel has not been established at the third timing.

3. The mobile communication system according to claim 1, wherein
 said mobile station further comprises means for continuing the synchronization establishment operation by continuing the transmission of the uplink individual channel or reception of the downlink individual channel in the case where the synchronization of the uplink individual channel or downlink individual channel has not been established at the third timing.

4. The mobile communication system according to claim 1, wherein
 said base station further comprises means for continuing the synchronization establishment operation by continuing the transmission of the downlink individual channel or reception of the uplink individual channel in the case where the synchronization of the uplink individual channel or downlink individual channel has not been established at the third timing.

5. The mobile communication system according to claim 1, wherein
 said base station is configured to transmit state update information indicating whether the mobile station can perform data transmission/reception in the case where the synchronization of a wireless link has been established at the third timing, and
 said mobile station is configured to be set to active state in which the data transmission/reception can be performed or suspend state in which the data transmission/reception cannot be performed based on the transmission/reception state update information.

6. The mobile communication system according to claim 1, wherein
 said base station is configured to transmit state update information indicating active state to the mobile station in the case where the synchronization of a wireless link has not been established at the third timing.

7. The mobile communication system according to claim 1, wherein
said base station is configured to notify the mobile station of synchronization unestablishment information in the case where the synchronization of a wireless link has not been established at the third timing.

8. A mobile communication system comprising:
a base station; and
a mobile station which performs data transmission/reception with the base station using a wireless link set between them,
wherein said base station comprises:
means for transmitting a downlink individual channel to the mobile station;
means for starting synchronization establishment operation of an uplink individual channel to be transmitted from the mobile station to base station at a first timing of a specified cycle previously set; and
means for performing transmission/reception of data to be transmitted in the case where the synchronization between the uplink individual channel and downlink individual channel has been established at a third timing of a specified cycle previously set and the data to be transmitted between the base station and the mobile station exists,
wherein said mobile station comprises:
means for transmitting the uplink individual channel to the base station;
means for starting synchronization establishment operation of the downlink individual channel at a second timing of a specified cycle previously set;
means for performing transmission/reception of data to be transmitted in the case where the synchronization between the uplink individual channel and downlink individual channel has been established at a third timing of a specified cycle previously set and the data to be transmitted, between the base station and mobile station, exists; and
means for suspending at least one of the transmission of the uplink individual channel or reception of the downlink individual channel in the case where the synchronization between the uplink individual channel and downlink individual channel has been established at the third timing and the data to be transmitted, between the base station and the mobile station, does not exist, and
wherein when the synchronization of the uplink individual channel or the downlink individual channel has not been established at the third timing, the synchronization establishment operation is continued.

9. The mobile communication system according to claim 8, wherein
said base station and the mobile station further comprises means for continuing the synchronization establishment operation in the case where the synchronization of the uplink individual channel or downlink individual channel has not been established at the third timing.

10. The mobile communication system according to claim 8, wherein
said mobile station further comprises means for continuing the synchronization establishment operation by continuing the transmission of the uplink individual channel or reception of the downlink individual channel in the case where the synchronization of the uplink individual channel or downlink individual channel has not been established at the third timing.

11. The mobile communication system according to claim 8, wherein
said base station further comprises means for continuing the synchronization establishment operation by continuing the transmission of the downlink individual channel or reception of the uplink individual channel in the case where the synchronization of the uplink individual channel or downlink individual channel has not been established at the third timing.

12. The mobile communication system according to claim 8, wherein
said mobile station is configured to perform notification of synchronization establishment completion information in response to completion of the synchronization establishment of the downlink individual channel in the case where the synchronization of a wireless link has not been established at the third timing and reception of the downlink individual channel is continued.

13. The mobile communication system according to claim 8, wherein
said base station is configured to transmit state update information indicating whether the mobile station can perform data transmission/reception in the case where the synchronization of a wireless link has been established at the third timing, and
said mobile station is configured to be set to active state in which the data transmission/reception can be performed or suspend state in which the data transmission/reception cannot be performed based on the transmission/reception state update information.

14. The mobile communication system according to claim 8, wherein
said base station is configured to transmit state update information indicating active state to the mobile station in the case where the synchronization of a wireless link has not been established at the third timing.

15. The mobile communication system according to claim 8, wherein
said base station is configured to notify the mobile station of synchronization unestablishment information in the case where the synchronization of a wireless link has not been established at the third timing.

16. A wireless communication method for use in a mobile communication system including a base station and a mobile station which performs data transmission/reception with the base station using a wireless link set between them, said method comprising:
a step in which the base station transmits a downlink individual channel to the mobile station;
a step in which the base station starts synchronization establishment operation of an uplink individual channel in response to transmission of the uplink individual channel from the mobile station to the base station;
a step in which the mobile station starts synchronization establishment operation of the downlink individual channel at a second timing of a specified cycle previously set;
a step in which the mobile station starts transmission of the uplink individual channel to the base station at the time when the synchronization of the downlink has been established;
a step in which the base station and the mobile station perform transmission/reception of data to be transmitted in the case where the synchronization between the uplink individual channel and downlink individual channel has been established at the third timing of a specified cycle previously set and the data to be transmitted between the base station and mobile station, exists;

a step in which the mobile station suspends at least one of the transmission of the uplink individual channel or reception of the downlink individual channel in the case where the synchronization between the uplink individual channel and downlink individual channel has been established at the third timing and the data to be transmitted, between the base station and mobile station, does not exist; and a step in which when the synchronization of the uplink individual channel or the downlink individual channel has not been established at the third timing, the synchronization establishment operation is continued.

17. The wireless communication method according to claim 16, further comprising
a step in which the base station and the mobile station continue the synchronization establishment operation in the case where the synchronization of the uplink individual channel or downlink individual channel has not been established at the third timing.

18. The wireless communication method according to claim 16, further comprising
a step in which the mobile station continues the synchronization establishment operation by continuing the transmission of the uplink individual channel or reception of the downlink individual channel in the case where the synchronization of the uplink individual channel or downlink individual channel has not been established at the third timing.

19. The wireless communication method according to claim 16, further comprising
a step in which the base station continues the synchronization establishment operation by continuing the transmission of the downlink individual channel or reception of the uplink individual channel in the case where the synchronization of the uplink individual channel or downlink individual channel has not been established at the third timing.

20. The wireless communication method according to claim 16, further comprising
a step in which the base station transmits state update information indicating whether the mobile station can perform data transmission/reception in the case where the synchronization of a wireless link has been established at the third timing, and
a step in which the mobile station is set to active state in which the data transmission/reception can be performed or suspend state in which the data transmission/reception cannot be performed based on transmission/reception state update information.

21. The wireless communication method according to claim 16, further comprising
a step in which the base station transmits state update information indicating active state to the mobile station in the case where the synchronization of a wireless link has not been established at the third timing.

22. The wireless communication method according to claim 16, further comprising
a step in which the base station notifies the mobile station of synchronization unestablishment information in the case where the synchronization of a wireless link has not been established at the third timing.

23. A wireless communication method for use in a mobile communication system including a base station and a mobile station which performs data transmission/reception with the base station using a wireless link set between them, comprising:

a step in which the base station transmits a downlink individual channel to the mobile station;

a step in which the base station starts synchronization establishment operation of an uplink individual channel transmitted from the mobile station to the base station at a first timing of a specified cycle previously set;

a step in which the mobile station transmits of the uplink individual channel to the base station;

a step in which the mobile station starts synchronization establishment operation of the downlink individual channel at a second timing of a specified cycle previously set;

a step in which the base station and the mobile station perform transmission/reception of data to be transmitted in the case where the synchronization between the uplink individual channel and downlink individual channel has been established at the third timing of a specified cycle previously set and the data to be transmitted, between the base station and the mobile station, exists;

a step in which the mobile station suspends at least one of the transmission of the uplink individual channel or reception of the downlink individual channel in the case where the synchronization between the uplink individual channel and downlink individual channel has been established at the third timing and the data to be transmitted, between the base station and the mobile station, does not exist; and a step in which when the synchronization of the uplink individual channel or the downlink individual channel has not been established at the third timing, the synchronization establishment operation is continued.

24. The wireless communication method according to claim 23, further comprising
a step in which the base station and the mobile station continue the synchronization establishment operation in the case where the synchronization of the uplink individual channel or downlink individual channel has not been established at the third timing.

25. The wireless communication method according to claim 23, further comprising
a step in which the mobile station continues the synchronization establishment operation by continuing the transmission of the uplink individual channel or reception of the downlink individual channel in the case where the synchronization of the uplink individual channel or downlink individual channel has not been established at the third timing.

26. The wireless communication method according to claim 23, further comprising
a step in which the base station continues the synchronization establishment operation by continuing the transmission of the downlink individual channel or reception of the uplink individual channel in the case where the synchronization of the uplink individual channel or downlink individual channel has not been established at the third timing.

27. The wireless communication method according to claim 23, further comprising
a step in which the mobile station performs notification of synchronization establishment completion information in response to completion of the synchronization establishment of the downlink individual channel in the case where the synchronization of a wireless link has not been established at the third timing and reception of the downlink individual channel is continued.

28. The wireless communication method according to claim 23, further comprising a step in which the base station transmits state update information indicating whether the mobile station can perform data transmission/reception in the case where the synchronization of a wireless link has been established at the third timing, and a step in which the mobile station is set to active state in which the data transmission/reception can be performed or suspend state in which the data transmission/reception cannot be performed based on transmission/reception state update information.

29. The wireless communication method according to claim 23, further comprising a step in which the base station transmits state update information indicating active state to the mobile station in the case where the synchronization of a wireless link has not been established at the third timing.

30. The wireless communication method according to claim 23, further comprising a step in which the base station notifies the mobile station of synchronization unestablishment information in the case where the synchronization of a wireless link has not been established at the third timing.

* * * * *